United States Patent
Chen et al.

(10) Patent No.: US 7,548,668 B2
(45) Date of Patent: Jun. 16, 2009

(54) PROGRAMMABLE OPTICAL ARRAY

(75) Inventors: Young-Kai Chen, Berkeley Heights, NJ (US); Andreas Leven, Gillette, NJ (US); Mahmoud Rasras, Berkeley Heights, NJ (US); Kun-Yii Tu, Califon, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/944,183

(22) Filed: Nov. 21, 2007

(65) Prior Publication Data

US 2009/0129723 A1    May 21, 2009

(51) Int. Cl.
*G02B 6/12* (2006.01)
*G02B 6/35* (2006.01)

(52) U.S. Cl. ............................ 385/14; 385/16; 385/27

(58) Field of Classification Search ........................ None
See application file for complete search history.

(56) References Cited

U.S. PATENT DOCUMENTS

| 6,195,187 B1 * | 2/2001 | Soref et al. ..................... 398/9 |
| 6,583,645 B1 * | 6/2003 | Bennett et al. ................. 326/41 |
| 6,876,796 B2 * | 4/2005 | Garito et al. ................... 385/50 |

* cited by examiner

*Primary Examiner*—Omar Rojas

(57) ABSTRACT

An apparatus having a topology that allows building complicated optical programmable arrays useful for manipulating the phase and/or amplitude of an optical signal. Sophisticated filtering and other optical signal processing functionality can be programmed into the array after a chip containing the array has been fabricated. This programming capability is analogous to that of electronic field programmable gate arrays (FPGA's). Apparatus described herein will provide a powerful tool for processing optical signals or very broadband electrical signals.

20 Claims, 9 Drawing Sheets

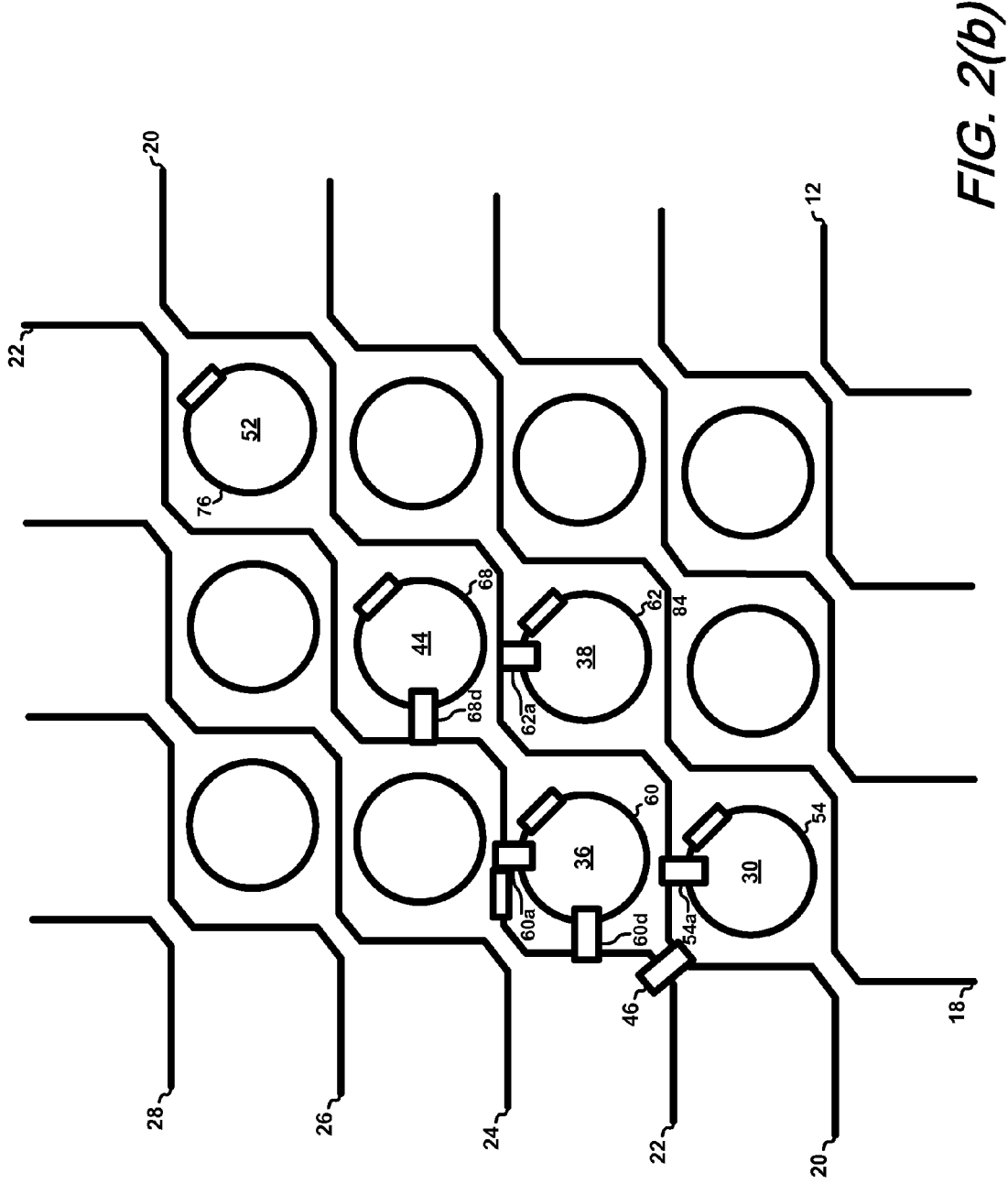

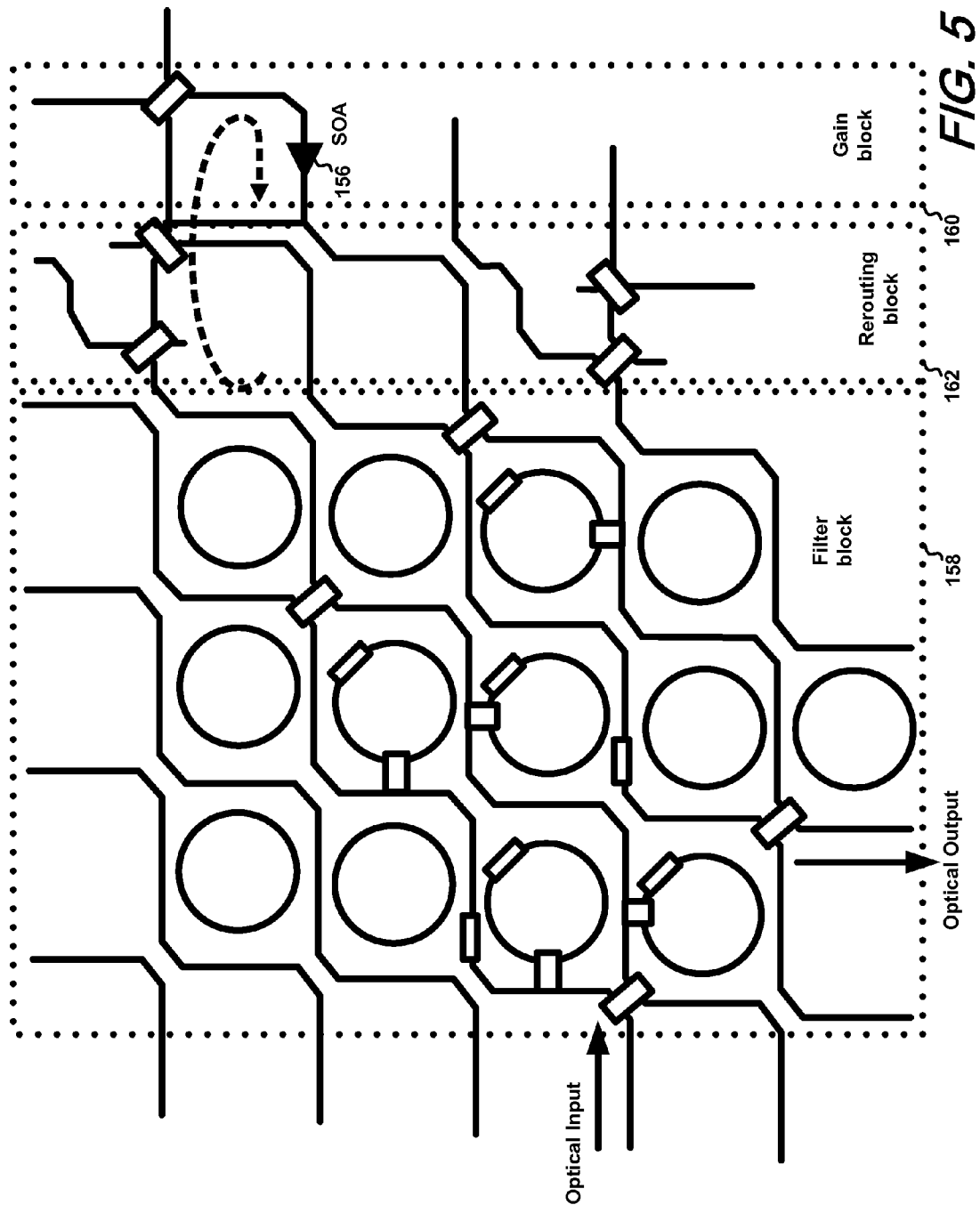

PROGRAMMABLE OPTICAL ARRAY

TECHNICAL FIELD

This disclosure relates to optical signal processing. More particularly, this disclosure relates to programmable arrays of optical signal processing elements that can be used to implement a variety of optical signal processing functions, such as filtering.

BACKGROUND

Field programmable gate arrays (FPGA's) have been widely used in electronic world. FPGA's are arrays of gates and logic elements that can be programmed to perform desired functions after the FPGA has been manufactured. Typically, an FPGA consists of an array of logic elements, for example, gates, lookup table RAM's, and flip-flops, interconnected together by programmable interconnect wiring. After the circuit chip is made, it can be programmed by users to perform different electronic functions by changing the interconnections and the functions of the individual blocks in the array. This type of circuit has been proven very powerful in new system prototyping and in situations where circuit system functions need be defined in the field. The needs of electronic circuit design met by FPGA's are also present in optical circuit design and it would be desirable to have an FPGA-like structure available to designers of optical systems.

SUMMARY

There are single individual optical filters built on monolithic platforms which are used for optical signal processing, such as band pass or notch filtering. Described herein is an apparatus having a topology that allows building complicated optical programmable arrays useful for manipulating the phase and/or amplitude of optical signals. Sophisticated filtering and other optical signal processing functionality can be programmed into the array after a chip containing the array has been fabricated similar to the way electronic FPGA's are programmed. Apparatus in accordance with the invention will provide a powerful tool for processing optical signals or very broadband electrical signals.

The basic construction of a generalized FPGA-like programmable optical array is described below. In one illustrative embodiment, the programmable array comprises a plurality of optical waveguides forming a rectangular grid of cells. Optical rings are located in the cells of the grid. A plurality of programmable coupling elements controllably couple selected ones of the waveguides together. Another plurality of programmable coupling elements controllably couple selected ones of the optical rings to selected ones of the waveguides. By selectively controlling the amount of coupling provided by the coupling elements, a variety of different optical signal processing functionalities can be implemented by the programmable array.

BRIEF DESCRIPTION OF THE DRAWING

FIG. 2(b) shows how the filter of FIG. 2(a) is implemented in the array of FIG. 1.

FIG. 5 shows an illustrative programmable optical array in accordance with the invention having a rerouting block and a gain block.

DETAILED DESCRIPTION

Programmable filter shapes and characteristics are critical in processing broadband optical signals. A programmable optical filter matrix architecture can be achieved in an optical programmable array in accordance with this invention. In an array in accordance with this invention, identical tunable unit cells are arranged in a geometric matrix that can be programmed to implement many different optical filtering characteristics and other signal processing functionality such as gain blocks and routing blocks. Multiple elementary cells can be cascaded or connected in parallel to form a more complex filter system of prescribed performance. An array in accordance with this invention can contain a variety of programmable ring-waveguide and waveguide-waveguide couplings and a variety of programmable waveguide routes through the array so that the array can function as an FPGA-like array for programmable optical signal processing.

Recent breakthroughs in semiconductor lithography have allowed people to build optical components by using a standard CMOS processing. See, for example, M. S. Rasras, D. M. Gill, S. S. Patel, A. E. White, K. Y. Tu and Y. K. Chen and etc., "Tunable Narrowband Optical Filter in CMOS," OFC2006, paper OFC-PD13, 2006. One of the successful examples is a fourth order filter with programmable center frequency and bandwidth. Interestingly, the same filter arrangement can be reprogrammed to function as a notch filter. Apparatus in accordance with this invention allows the programming of the connection, the amplitude coupling, the phase adjustment, and the gain of amplifier elements, to deliver various filter types such as Butterworth, Elliptic, and Chebychev filters, or various filter functions such as low pass, high pass, and notch filters. Moreover, the filters can be cascaded or connected in parallel to tailor the filtering spectrum to meet individualized needs. Elements on the circuit can include digital or analog optical modulators, waveform generators, or optoelectronic mixed signal components as its subcomponents. Electrical FPGA's coexisting with optical FPGA-like circuits on the same chip may be used to perform more complicated signal processing.

A) BASIC STRUCTURE OF AN ILLUSTRATIVE OPTICAL FIELD PROGRAMMABLE ARRAY

An optical filter can be constructed by cascading various numbers of coupled optical ring structures, each coupled ring structure forming a pole-zero pair in the frequency domain. By properly positioning pole-zero pairs and adjusting the power coupling into the ring, a box-like filter can be formed with impressive filter shape. See, for example, the Rasras et al. article cited above. Similarly, one can implement other types of filters, such as notch filters, by using a small set of programmable optical components.

Figure 1:
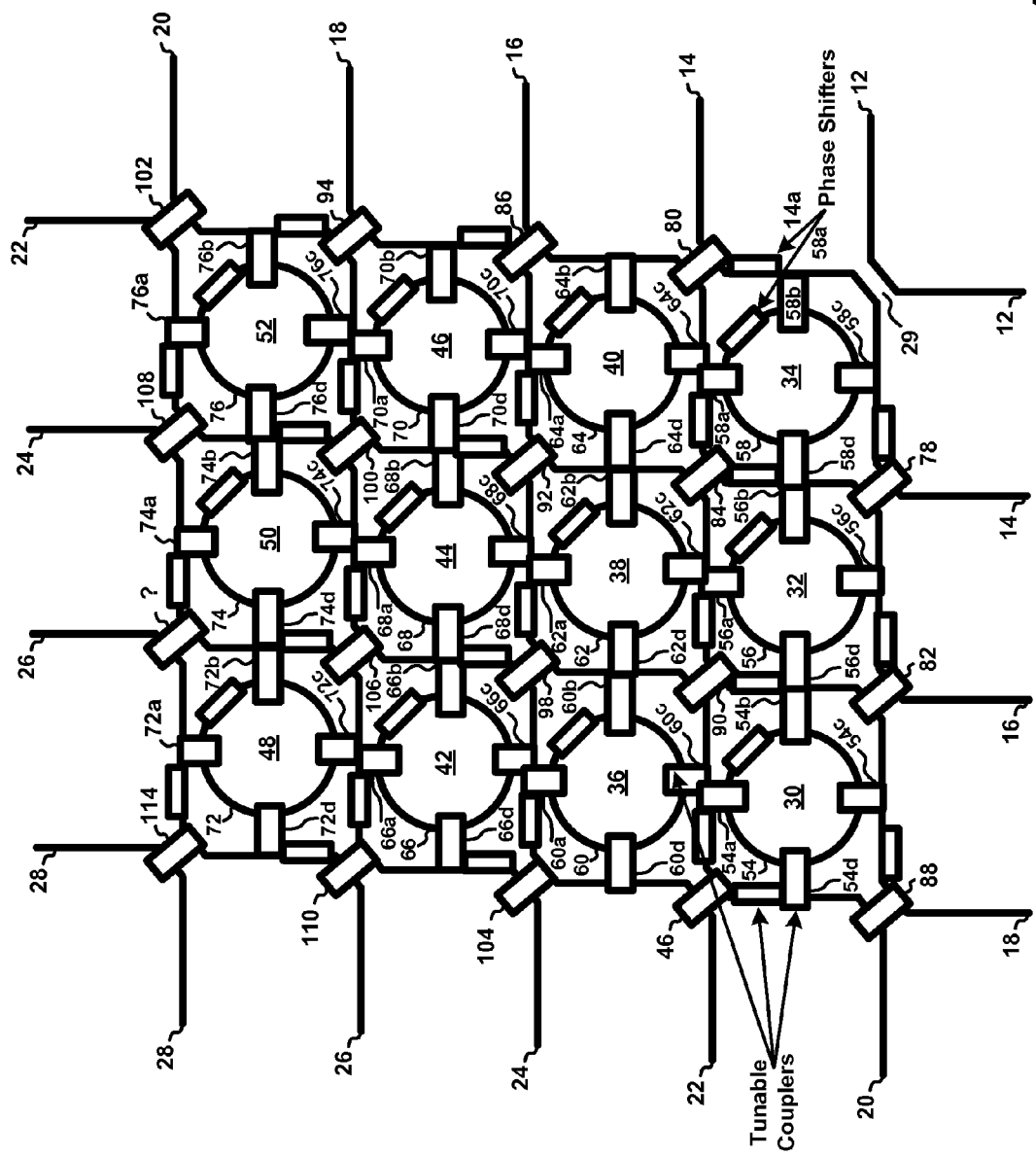
FIG. 1 shows an illustrative programmable optical array in accordance with this invention.

FIG. 1 shows a generalized array 10 of optical components that can be programmed to implement a variety of filters and other optical signal processing functions. For example, one or more of pole-zero filters, all-zero filters, all-pole filters, notch filters, band-pass filters, low pass filters, and high pass filters may be implemented in the array of FIG. 1. In some embodiments of the invention, notch, band-pass, low pass, and high pass filters may be formed by properly tuning pole-zero, all-zero, or all pole filters. The structure of FIG. 1 also permits the implementation of other optical signal processing elements, such as routing elements and amplification elements.

The array 10 of FIG. 1 comprises a plurality of generally parallel waveguides, numbered 12, 14, 16, 18, 20, 22, 24, 26, and 28 at each end of a respective waveguide. Each waveguide extends in a stair-steep fashion at a 45 degree angle from lower left to upper right in FIG. 1 thereby forming a rectangular grid bounding a plurality of generally rectangular cells 30, 32, 34, 36, 38, 40, 42, 44, 46, 48, 50, and 52. A plurality of optical rings 54, 56, 58, 60, 62, 64, 66, 68, 70, 72, 74, and 76 are located in the cells 30, 32, 34, 36, 38, 40, 42, 44, 46, 48, 50, and 52 formed by the waveguides 12, 14, 16, 18, 20, 22, 24, 26, and 28.

The waveguides 12, 14, 16, 18, 20, 22, 24, 26, and 28 are aligned such that adjacent waveguides get close to one another at the corners of the stair steps as illustratively shown at reference numeral 29 at the junction between waveguides 12 and 14 in the lower right hand corner of FIG. 1. The amount of coupling between adjacent waveguides can be controlled by way of a programmable coupling element located at one or more of the junctions between waveguides. The example of the invention shown in FIG. 1 comprises programmable coupling elements 78 and 80 that selectively couple waveguides 14 and 16. Programmable coupling elements 82, 84, and 86 selectively couple waveguides 16 and 18 together. Programmable coupling elements 88, 90, 92, and 94 selectively couple waveguides 18 and 20 together. Programmable coupling elements 96, 98, 100, and 102 selectively couple waveguides 20 and 22 together. Programmable coupling elements 104, 106, and 108 selectively couple waveguides 22 and 24 together. Programmable coupling elements 110 and 112 selectively couple waveguides 24 and 26 together. Finally, programmable coupling element 114 selectively couples waveguides 26 and 28 together.

Each of the optical rings 54, 56, 58, 60, 62, 64, 66, 68, 70, 72, 74, and 76 is coupled to each of the four waveguide segments that form the boundaries of the respective cell 30, 32, 34, 36, 38, 40, 42, 44, 46, 48, 50, or 52 in which the ring is located. This programmable coupling is achieved by way of programmable coupling elements like those programmable coupling elements just described that selectively couple the waveguides together. The programmable coupling elements that couple the optical rings to the waveguide segments that define the cells are given the same reference numerals as their respective optical rings followed by the letters a, b, c, or d. For example, programmable coupling elements 54a, 54b, 54c, and 54d selectively couple ring 54 in cell 30 to segments of waveguides 18 and 20 in FIG. 1.

One or more of the rings 54, 56, 58, 60, 62, 64, 66, 68, 70, 72, 74, and 76 in the Example of the invention shown in FIG. 1 contains an optical phase shifter that controls the phase of optical signals flowing in each respective ring. An illustrative phase shifter in one of the rings 58 is numbered 58e in FIG. 1. One or more of the waveguide segments may also contain a phase shifter that controls the phase of optical signals flowing through one or more of the waveguides 12, 14, 16, 18, 20, 22, 24, 26, and 28. An illustrative one of those phase shifters in one of the waveguides 14 is numbered 14a in FIG. 1.

The waveguides, rings, and coupling elements in the example of the invention shown in FIG. 1 may be built using standard silicon based complementary metal oxide semiconductor (CMOS) technology. The programmable couplers shown in FIG. 1 may be any coupler that can be controlled to provide a predetermined amount of coupling between optical structures such as waveguides and rings. Examples of such coupling elements include, for example, Mach-Zehnder (MZ) interferometers. MZs are composed of two 2×2 directional couplers separated by waveguides at both ends. By tuning the differential phase across the MZ arms, the coupling ratios can be tuned to any desired level. Full coupling and zero coupling (i.e. switching) also are possible using this structure.

B) LOW PASS FILTERS EMBEDDED IN THE FILTER ARRAY

Figure 2A:
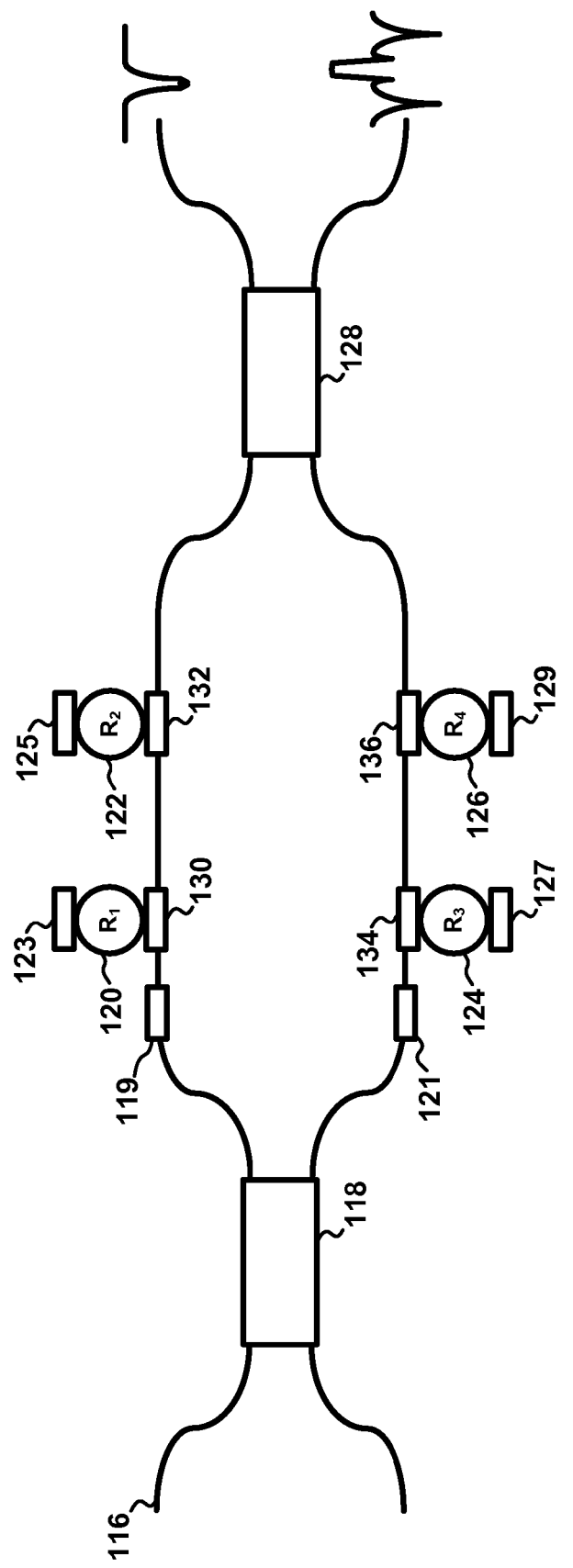
FIG. 2(a) shows an illustrative $4^{th}$ order pole-zero filter that can be implemented in the array of FIG. 1.

FIGS. 2(a) and 2(b) show an illustrative filter that may be embedded in the optical filter array shown in FIG. 1. FIG. 2a illustrates a basic $4^{th}$ order pole-zero filter having a filter spectrum as shown on the filter output ports. The $4^{th}$ order pole-zero filter design of FIG. 2(a) may be created, for example, by a silicon CMOS process. FIG. 2(b) illustrates the same basic filter embedded in an optical array structure similar to that shown in FIG. 1.

Input light 116 is split by a coupler 118. One component of the input light 116 is coupled to optical rings 120 and 122 by means of couplers 130 and 132 in the waveguide forming the upper arm of the filter. The other component of the input light 116 split by coupler 118 is coupled to optical rings 124 and 126 by means of couplers 134 and 136 in the waveguide forming the lower arm of the filter. The light components flowing in the upper and lower arms of the filter are recombined in a coupler 128 to form a $4^{th}$ order elliptical filter function. The coupling ratio between waveguides at the input and output are adjustable and the coupling between ring and the waveguides are also adjustable. There are also phase shifting elements 119, 121, 123, 125, 127, and 129 on the waveguides and the rings as shown in FIG. 2(a). Such a structure can be implemented as a sub set of the filter array elements shown in FIG. 1.

The structure of FIG. 2(a) can be achieved in the array of FIG. 1 by turning on coupling elements 96 and 100, corresponding to couplers 118 and 128 in FIG. 2(a), to couple waveguides 20 and 22. Coupling element 54a is turned on to couple optical ring 54 to one of the horizontal segments of waveguide 20. Coupling element 62a is turned on to couple optical ring 62 to another one of the horizontal segments of waveguide 20. Coupling element 60d is turned on to couple optical ring 60 to one of the vertical segments of waveguide 22. Coupling element 68d is turned on to couple optical ring 68 to one of the vertical segments of waveguide 22. Phase shifting elements like phase shifting elements 119, 121, 123, 125, 127, and 129 shown in FIG. 2(a) may be fabricated into any appropriate place in the array, including throughout the entire array, to control the phase of light flowing through the device. If a filter like the one shown in FIG. 2(a) is to be implemented, then a phase shifting device may be fabricated (a) in waveguide 20 between coupling element 96 and coupling element 54a; (b) in each of the optical rings 54, 60, 62, and 68; and (c) in waveguide 22 between coupling element 96 and 60d.

A phase adjuster can be placed at any place on any of the waveguides and rings in the array of FIG. 1 to provide the ability to tune the performance of any filter or other component embedded in the array. All coupling and phase adjustments can be achieved, for example, with a heating element closely built next to a waveguide or optical ring.

Although there are many coupling elements in the array of FIG. 1, construction of a $4^{th}$ order filter only requires six of those coupling elements. Allowing the rings to couple to a waveguide on any of its four sides permits versatile filter construction, convenient input/output placements, and a higher density of devices built on the same area.

C) NOTCH FILTERS EMBEDDED IN THE OPTICAL PROGRAMMABLE ARRAY

Figure 3A:
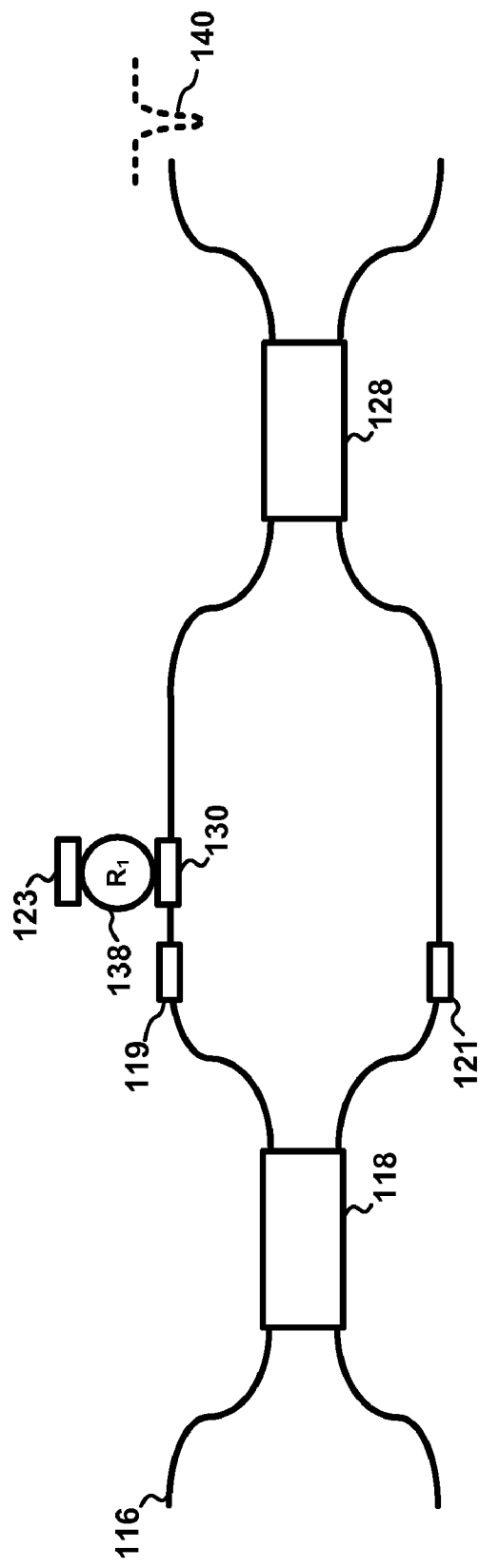
FIG. 3(a) shows an illustrative notch filter that can be implemented in the array of FIG. 1.

Another useful filter example that could be implemented in the array of FIG. 1 is a notch filter which is commonly used to remove an unwanted frequency from an optical signal. FIG. 3(a) is a diagram showing an illustrative notch filter. The filter of FIG. 3(a) has only one ring 138 with a Mach-Zehnder (MZ) structure. The output of the filter is represented by the curve 140 in FIG. 3(b). A detailed discussion of such notch filters is found, for example, in Madsen, C. K.; Cappuzzo, M.; Chen, E.; Gomez, L.; Griffin, A.; Laskowski, E. J.; Stulz, L.; Wong-Foy, "A tunable ultra-narrowband filter for subcarrier processing and optical monitoring," Optical Fiber Communication Conference, 2004. OFC 2004, TUL5, 2004.

Figure 3B:
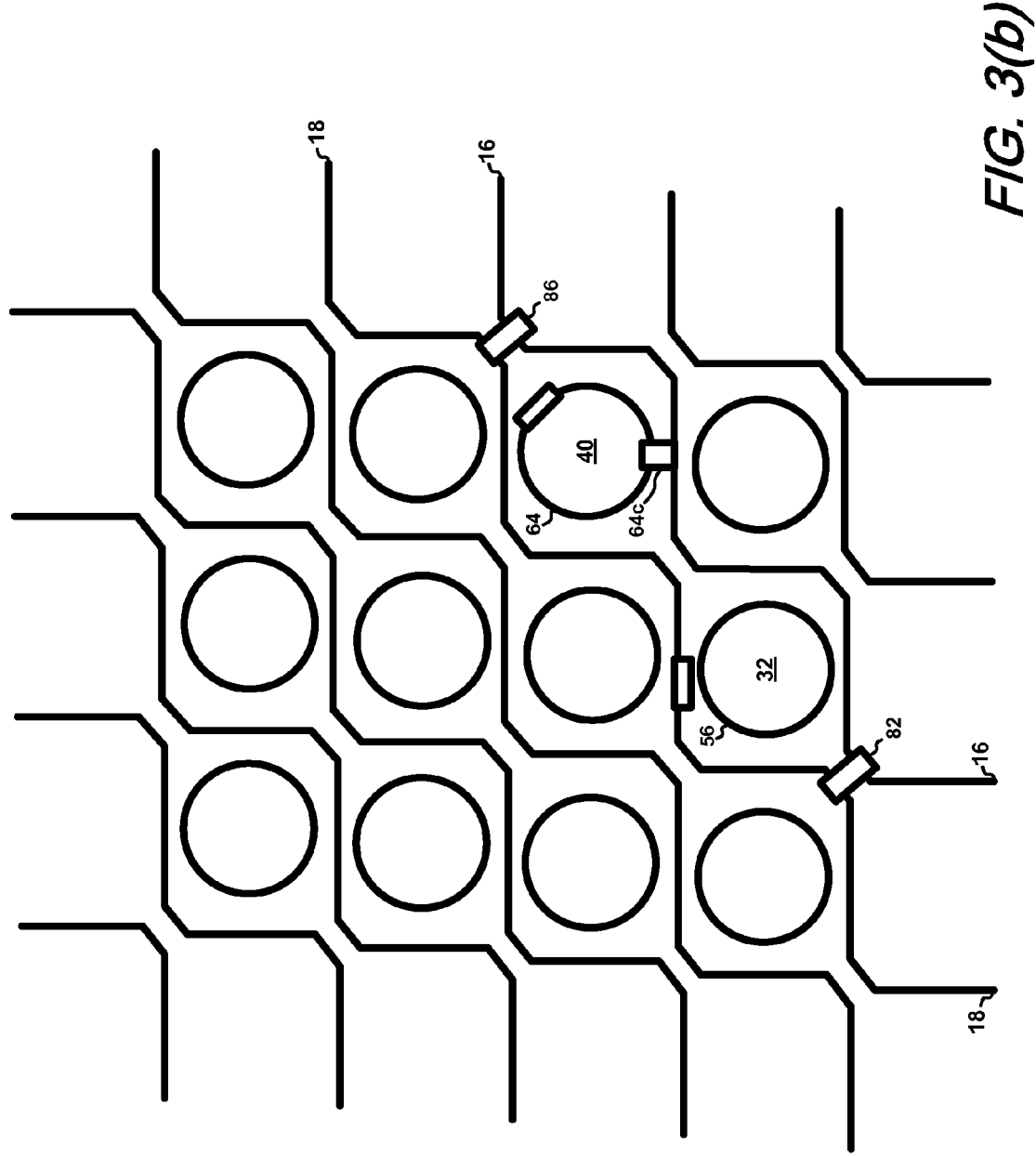
FIG. 3(b) shows how the filter of FIG. 3(a) is implemented in the array of FIG. 1.

FIG. 3(b) shows a notch filter like the one shown in FIG. 3(a) implemented in the filter array of FIG. 1 by turning on one ring 64 and three couplers 64c, 82, and 86. The phase shifters labeled in FIG. 3(b) may be used to tune the filter.

D) COMPACT CONSTRUCTION OF A CASCADED FILTER IN AN OPTICAL PROGRAMMABLE ARRAY

Figure 4A:
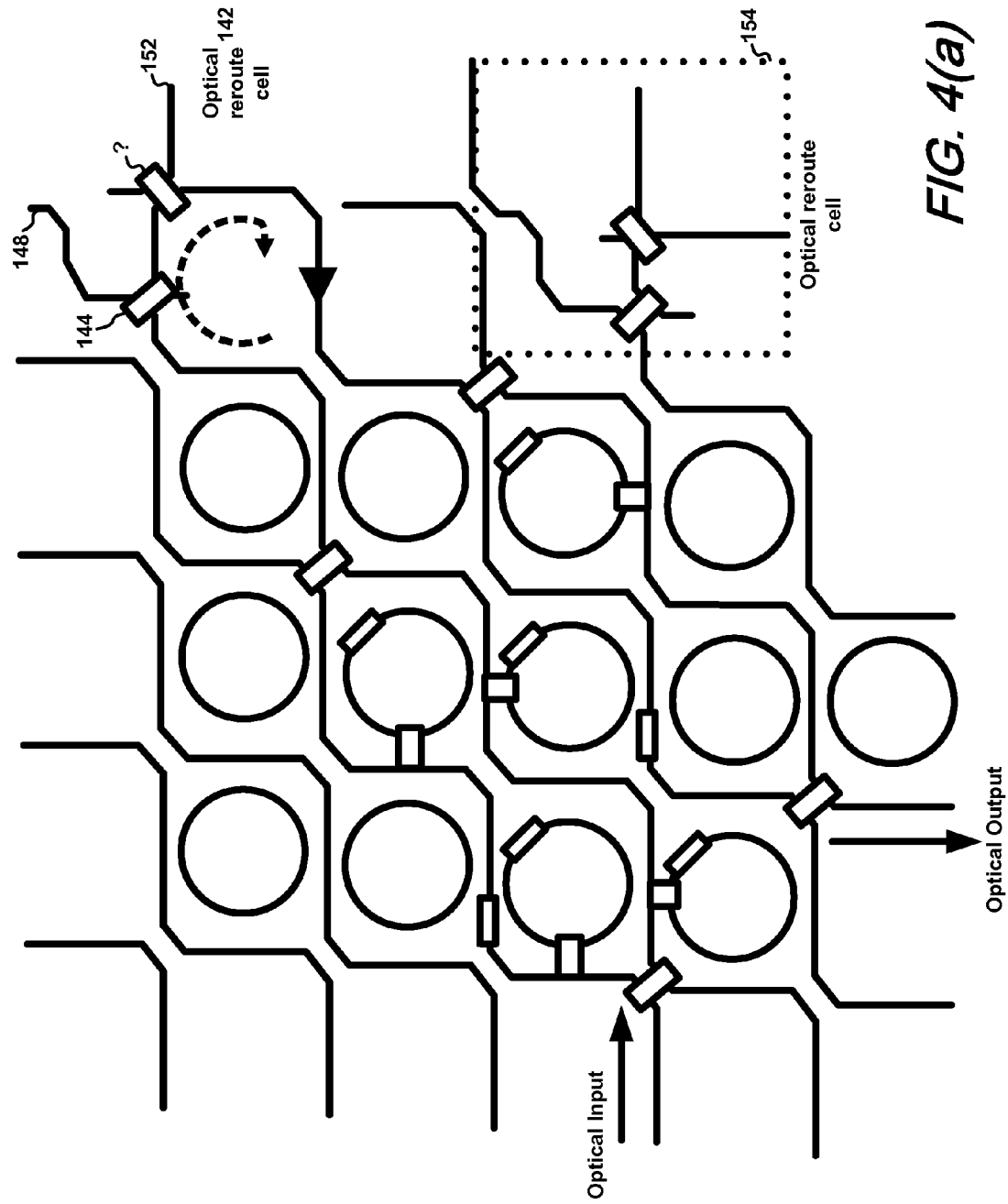
FIG. 4(a) shows an illustrative filter cascade implemented in an array like the one shown in FIG. 1 by using an optical reroute block.
Figure 4B:
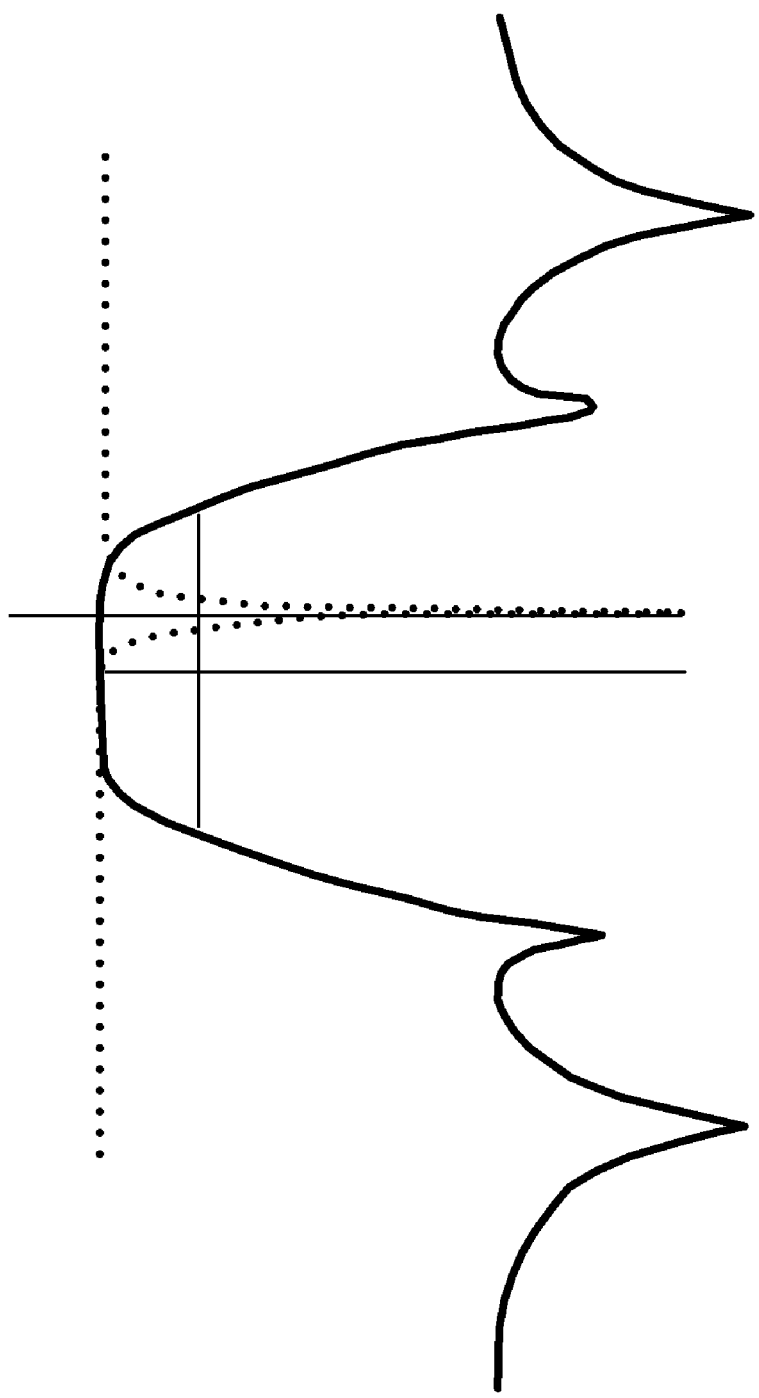
FIG. 4(b) shows the frequency response of the filter cascade shown in FIG. 4(a).

In the above sections B and C, a low pass filter and a notch filter constructed in small compact areas of the filter array have been demonstrated. FIG. 4(a) shows cascaded band-pass and notch filters in an optical programmable array with an optical reroute element. FIG. 4(b) shows the output spectrum of cascaded band-pass and notch filters.

By using optical reroute cell, like the optical reroute cells 142 and 154 shown in FIG. 4(a), the system would allow the optical path to be rerouted in opposite directions such that two filters can be programmed using nearby waveguides and rings. The optical reroute cell 142 is constructed of two optical couplers 144 and 146. Coupler 144 controllably couples waveguides 148 and 150 together. Coupler 146 controllably couples waveguides 150 and 152 together. The couplers 144 and 146 and the waveguides 148, 150, and 152 allow the optical path through the array to be redirected by switching either one of the couplers depending on the transmission direction. One possible application of reroute cells 142 and 154 in FIG. 4(a) is to cascade a band pass filter like the one shown in FIG. 2(b) with a notch filter like the one shown in FIG. 3(b), such that the band-pass spectrum of the FIG. 2(b) filter can be provided with a sharp notch produced by the filter of FIG. 3(b). The band pass filter center frequency and bandwidth are tunable and so is the notch filter center frequency. With this tunability and field programmable capability, optical arrays in accordance with this invention can become very powerful in that more complicated systems can be hierarchically constructed.

E) OPTICAL PROGRAMMABLE ARRAY WITH GAIN CELLS

As the complexity of the system described above increases, optical losses begin to add up and the system eventually will render itself a useless device at a certain level of complexity. Therefore placing gain elements in the programmable array would be an important improvement. In one embodiment of the invention, an optical programmable array will have a dedicated area where gain elements 156 are embedded as shown in FIG. 5. Because of the flexibility of rerouting the optical paths, some of the middle stage connections will be routed to a gain cell to compensate for losses in the elements, as also shown in FIG. 5. In the example of the invention shown in FIG. 5, the optical programmable array has filter block 158, an optical gain block 160, and an optical rerouting block 162. The operations of those blocks are programmable. One of the typical gain cells available would be the semiconductor optical amplifier (SOA) which can be turned on to provide gain and turned off to shut off the transmission. A reroute element can provide the path going through the SOA's.

G) IMPLEMENTATION OF AN INTEGRATED RING RESONATOR CELL FOR FILTER ARRAY

Figure 6:
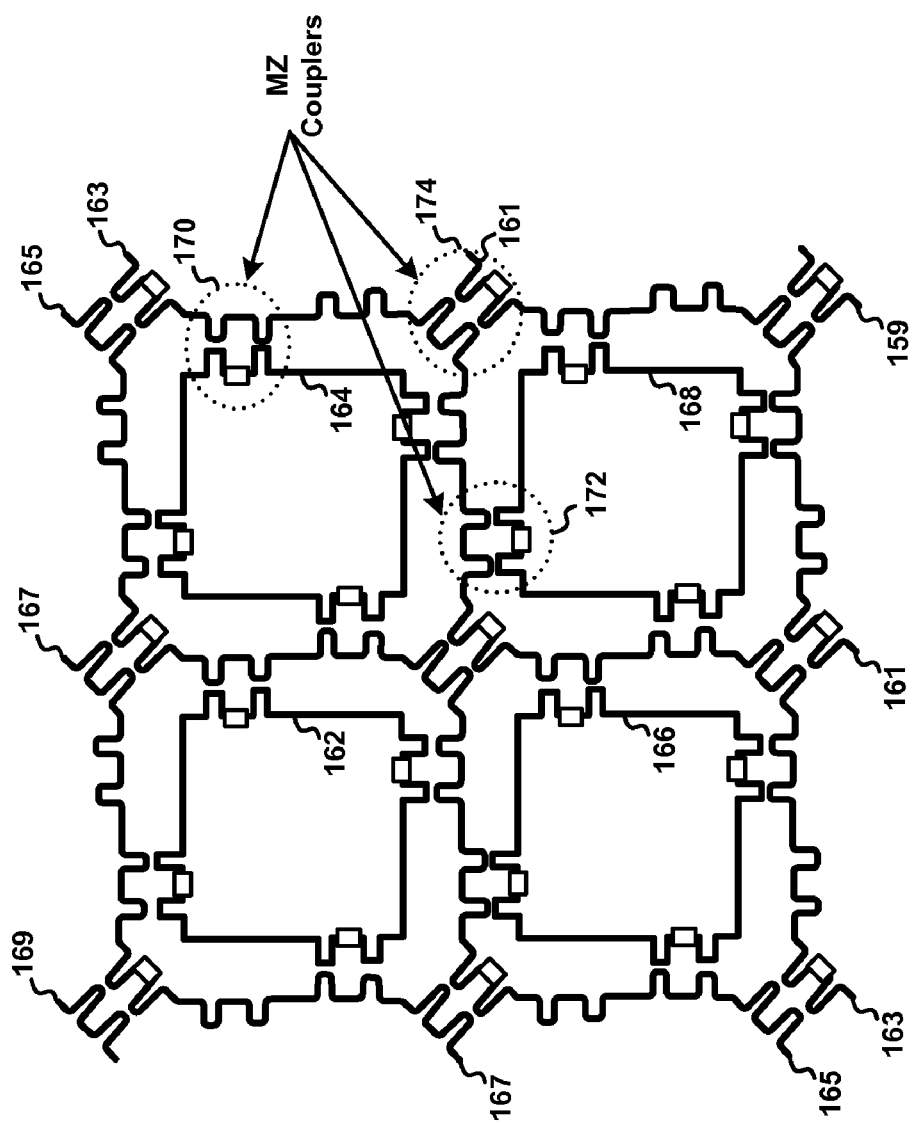
FIG. 6 shows a more detailed depiction of a four cell array in accordance with the invention.

FIG. 6 shows another embodiment of a programmable optical array in accordance with the invention comprising four representative cells of a potentially larger array. FIG. 6 depicts four rectangular rings 162, 164, 166, and 168. The rings 162, 164, 166, and 168 contain Mach-Zehnder (MZ) couplers on four sides. MZ couplers are also located in each of waveguides 159, 161, 163, 165, 167, and 169 that surround each ring and they are adjacent to a corresponding MZ coupler contained one of the rings. Two representative pairs of MZ couplers in the rings and waveguides are given reference numbers 170 and 172 in FIG. 6. MZ coupler pairs are also formed in the waveguides to selectively couple pairs of waveguides together. One of those MZ coupler pairs is labeled with reference numeral 174 in FIG. 6. Each MZ coupler pair has a heating element to adjust the coupling ratio. Two representative ones of those heaters are labeled with reference numerals 176 and 178 in FIG. 6.

H) CONCLUSION

In accordance with this invention, an optical array can be programmed to implement various optical filter characteristics with center frequency and bandwidth tuned as desired. The platform is such that basic elements are on a single semiconductor chip and they can be programmed dynamically like an electronic FPGA circuit. Optical rerouting and gain blocks were included to redirect and amplify the optical signal in the array which allows optimization of the system performance. It is also envisioned that other elements such as digital or analog optical modulators, optical detectors, and electronic drivers and receivers can also be part of the element library eligible for inclusion into embodiments of programmable arrays in accordance with this invention.

The Title, Technical Field, Background, Summary, Brief Description of the Drawings, Detailed Description, and Abstract are meant to illustrate the preferred embodiments of the invention and are not in any way intended to limit the scope of the invention. The scope of the invention is solely defined and limited by the claims set forth below.

The invention claimed is:
1. A programmable optical array, comprising:
   a plurality of optical waveguides forming a rectangular grid of cells;
   a plurality of optical rings, each optical ring being located in one of the cells of the grid;

a plurality of programmable coupling elements that controllably couple selected ones of the waveguides together; and a plurality of programmable coupling elements that controllably couple selected ones of the optical rings to selected ones of the waveguides, wherein the cells having an optical ring located therein, are identical to one another.

2. The array of claim 1, in which one or more of the waveguides, rings, and coupling elements are silicon CMOS structures.

3. The array of claim 1, in which the coupling elements are programmed, such that selectively coupled identical cells form at least one filter in the array.

4. The array of claim 3, in which the filter is a notch filter.

5. The array of claim 3, in which the filter is a high pass filter.

6. The array of claim 3, in which the filter is a low pass filter.

7. The array of claim 3, in which the filter is a pole-zero filter.

8. The array of claim 3, in which the filter is an all-zero filter.

9. The array of claim 3, in which the filter is a band-pass filter.

10. The array of claim 7, in which the filter is a fourth order pole-zero filter.

11. The array of claim 3, in which the filter is an all-pole filter.

12. The array of claim 1, in which the coupling elements are programmed, such that selectively coupled identical cells form a filter cascade in the array.

13. The array of claim 12, in which the filter cascade comprises a band-pass filter in series with a notch filter.

14. The array of claim 1, further comprising one or more optical routing elements adapted to route optical signals through the array.

15. The array of claim 12, further comprising one or more optical routing elements adapted to route optical signals from one filter in the cascade to another filter in the cascade.

16. The array of claim 1, further comprising at least one gain element adapted to amplify one or more optical signals in the array.

17. The array of claim 16, in which the gain element is a semiconductor optical amplifier.

18. The array of claim 1, further comprising one or more phase adjustment elements adapted to adjust the phase of one or more optical signals flowing through the array.

19. The array of claim 1, further comprising at least one device that controls the amount of coupling provided by one or more of the coupling elements.

20. The array of claim 19, in which the device is a heating element.

* * * * *